United States Patent

Bederka et al.

[11] Patent Number: 5,145,207
[45] Date of Patent: Sep. 8, 1992

[54] MOUNTING MEANS FOR A VEHICLE PASSENGER SIDE AIR BAG STRUCTURE

[75] Inventors: John M. Bederka, Madison Heights; Michael J. Suran, Clarkston; Ahmed El-Bohy, Oak Park, all of Mich.

[73] Assignee: Chrysler Corporation, Highland Park, Mich.

[21] Appl. No.: 731,177

[22] Filed: Jul. 15, 1991

[51] Int. Cl.5 ............................................. B60R 21/16
[52] U.S. Cl. .................................... 280/732; 280/743
[58] Field of Search ................ 280/728, 731, 732, 743

[56] References Cited

U.S. PATENT DOCUMENTS

| | | | |
|---|---|---|---|
| 3,708,179 | 1/1973 | Hulten | 280/732 |
| 4,770,439 | 9/1988 | Maier et al. | 280/732 |
| 4,834,421 | 5/1989 | Korber et al. | 280/732 |
| 4,941,678 | 7/1990 | Lauriteen et al. | 280/732 |
| 5,031,930 | 7/1991 | Sato | 280/732 |

Primary Examiner—Kenneth R. Rice
Attorney, Agent, or Firm—Edward A. Craig

[57] ABSTRACT

Mounting means for a vehicle passenger side air bag structure are provided. The air bag structure includes an air bag housing for containing an uninflated air bag and an air bag deployment chute mounted in a vehicle instrument panel opening on the passenger side. A portion of the air bag housing is slidably received in the air bag deployment chute. A connector bracket interconnects the air bag housing and air bag deployment chute preventing separation thereof during deployment of an air bag.

5 Claims, 2 Drawing Sheets

— 5,145,207 —

MOUNTING MEANS FOR A VEHICLE PASSENGER SIDE AIR BAG STRUCTURE

BACKGROUND OF THE INVENTION

1. Field of the Invention

This invention relates to mounting means for a vehicle passenger side air bag structure which includes an air bag housing which is slidably received in an air bag deployment chute mounted in an opening of a vehicle instrument panel. A connector bracket secures the housing and chute together.

2. Description of Related Art

Inflatable air bag structures are being commonly used in passenger vehicles to promote passenger safety in the event of an accident. Such air bag structures include inflation means which, when activated, rapidly form a gas which causes high speed inflation of air bags in front of passengers to absorb impact shock to thereby minimize injury. Sensor systems are provided to cause activation of the air bag structure immediately upon vehicle impact.

Air bags are folded and mounted in relatively small canister-like housings which are positioned behind the vehicle instrument panel. The housing is slidably mounted in a chute structure which, in turn, is mounted in an opening in the instrument panel in front of the area occupied by the passenger in the front seat of the vehicle. As the air bag is deployed, it passes into the chute and is guided by the chute into the proper area within the vehicle to function in the desired shock absorbing fashion.

It is important that the air bag be deployed through the chute without any hitches of any sort. The expansion which causes deployment of the chute also results in a recoil effect upon the air bag housing. This recoil effect tends to cause separation of the air bag housing from the chute. Undue separation could cause snagging of the air bag with the chute and housing structure and result in improper air bag deployment. In accordance with the present invention, this possibility is minimized by providing adjustable bracket structure interconnecting the chute and air bag housing.

SUMMARY OF THE INVENTION

Mounting means are provided for a vehicle passenger side air bag structure which includes an air bag housing for containing an uninflated air bag. An air bag housing bracket is secured between the air bag housing and support structure of a vehicle.

An air bag deployment chute is mounted in an opening provided in a vehicle instrument panel on the passenger side thereof. A portion of the air bag housing is slidably received in the air bag deployment chute in a portion of the air bag deployment chute extending forwardly of the instrument panel.

The air bag housing and air bag deployment chute each have left and right end portions. A connector bracket extends between each pair of left and right end portions of the air bag housing and air bag deployment chute. Each connector bracket comprises a first hook element secured to the air bag housing and a second hook element secured to the air bag deployment chute. Each hook element terminates in a substantially U-shaped hook having an open mouth. The mouths of the hooks of the first hook elements face away from the instrument panel and the mouths of the hooks of the second hook elements face toward the instrument panel. Each hook has a free end portion. The free end portion of the hook of the first hook element is received within the hook of the second hook element and the free end portion of the hook of the second hook element is received within the hook of the first hook element.

Preferably, the free end portions of the hooks are each dimensioned to terminate short of contact with the hooks within which they are received to thereby accommodate variations in the position of the air bag deployment chute. The first hook elements are fixedly secured in place and the second hook elements are releasably secured in place.

The hook elements are fabricated of a springy material. Each hook element comprises a leg one end of which is secured in place and the other end of which carries the hook. The hooks of the first hook elements are in line with the hooks of the second hook elements so as to impinge there against upon sliding of the air bag housing into the air bag deployment chute causing said legs to deflect to permit passage of the hooks by each other and then spring back into engagement with each other and thereafter prevent withdrawal of the air bag housing. The legs of the second hooks elements each including an offsetting segment extending away from the air bag deployment cute. The offsetting segments function as stops for the hooks of the first hook elements to limit the extent of sliding of the air bag housing into the air bag deployment chute.

IN THE DRAWINGS

DETAILED DESCRIPTION OF A PREFERRED EMBODIMENT

Figure 1:
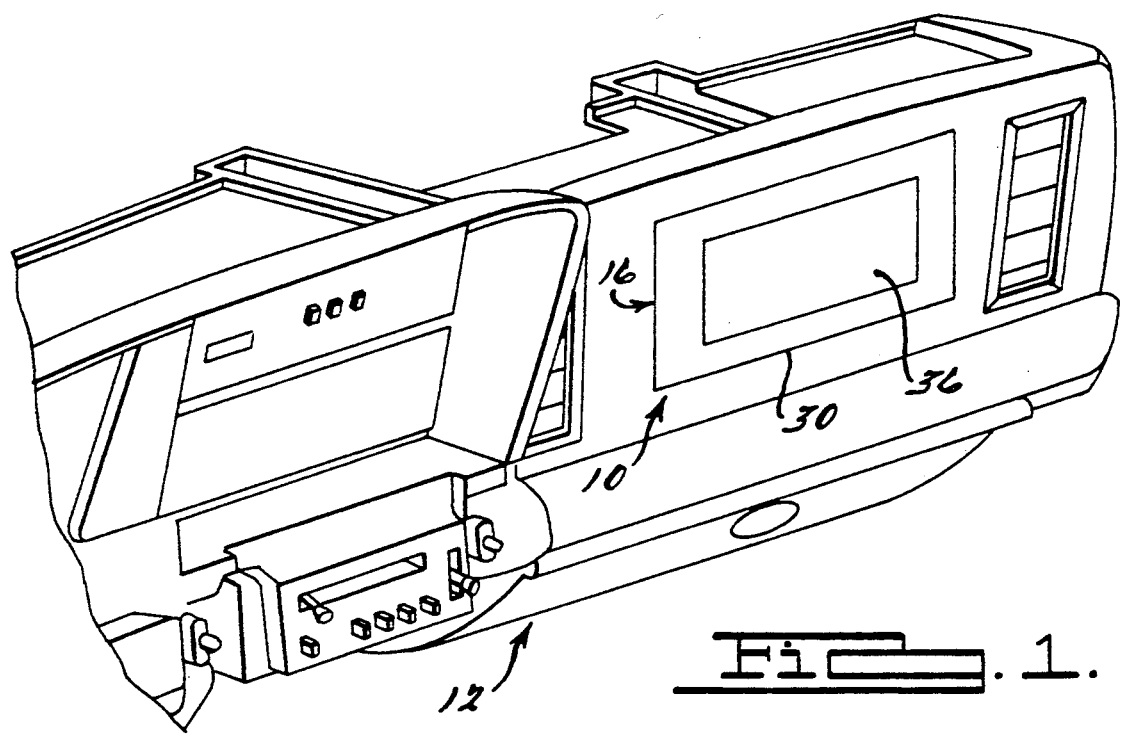
FIG. 1 is a view in perspective of the passenger side portion of an instrument panel as viewed from the interior of a vehicle illustrating the positionment of the passenger side air bag structure in accordance with one embodiment of the present invention.
Figure 2:
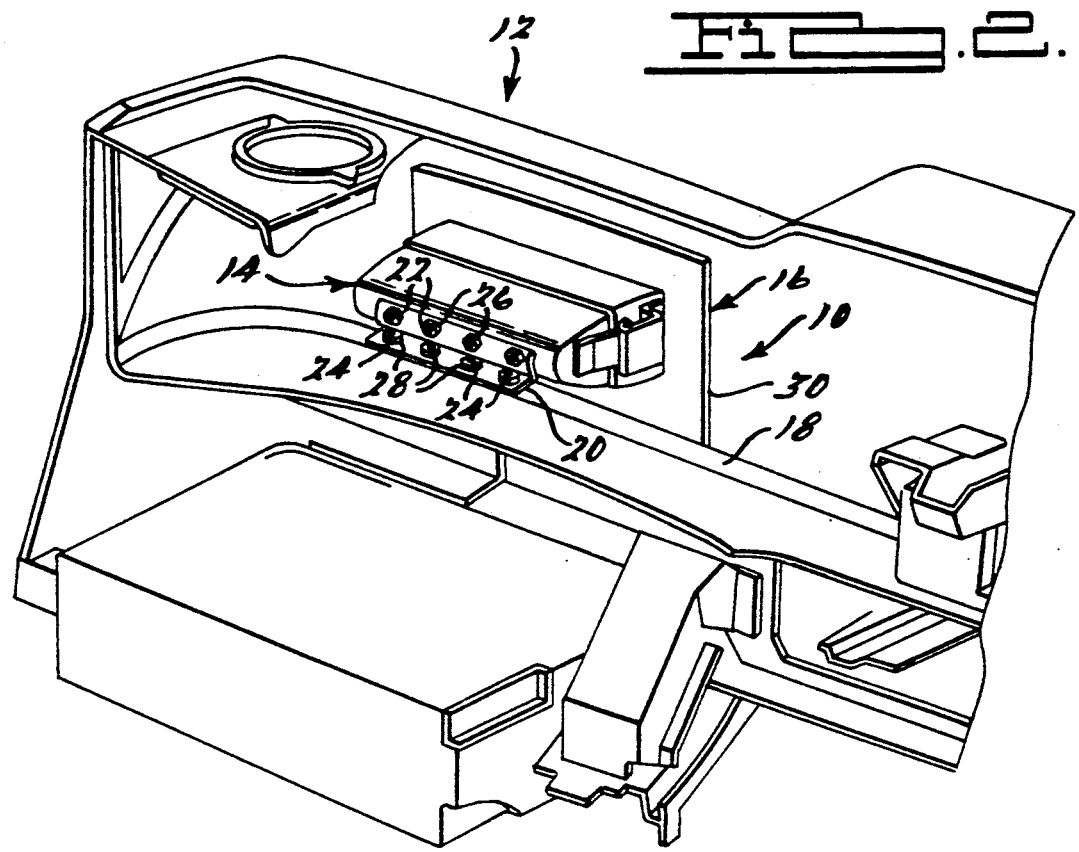
FIG. 2 is a view in perspective of the opposite side of the instrument panel shown in FIG. 1 illustrating the forward portion of the passenger air bag structure.

Referring to FIGS. 1 and 2, it will be noted that the vehicle passenger side air bag structure 10 of the present invention is mounted on the passenger, or right, side of the instrument panel 12. The instrument panel 12 is, of course, securely mounted to vehicle structure as is conventional. The air bag structure 10 includes an air bag housing 14 and an air bag deployment chute 16.

The air bag housing 14 encloses a folded air bag and air bag inflater device (not shown) as is conventional. The air bag inflater device includes expansion means which, when energized, rapidly forms into an inflating gas. A sensor system (not shown) is provided in the vehicle structure for detecting impact and instantly causing air bag inflation. Such structures are conventional and wellknown The air bag housing 14 is secured to vehicle support structure 18 by means of an air bag housing bracket 20. The bracket 20 is substantially V-shaped with each leg including a plurality of openings through which threaded studs 22 extending from the air bag housing 14 and threaded studs 24 extending from vehicle support structure 18 extend. Nut structures 26, 28 are received on the threaded studs to thereby secure the air bag housing 14 in place.

The air bag deployment chute 16 is mounted in an opening 30 provided in the instrument panel 12 on the passenger side thereof. The air bag deployment chute 16 includes a hollow chute portion 32 which is surrounded by a peripheral flange 34 on the rearward edge thereof, the terms "rearward" and "forward" being used to denote a position with respect to the forward or rearward end of the vehicle. The flange 34 is flush with the exterior surface of the instrument panel 12 as will be noted in FIG. 1. A frangible door 36 is provided within the flange 34. The door 36, when impacted by an expanding air bag, deploys rearwardly permitting the air bag to exit and expand in front of a passenger. The air bag deployment chute 16 functions to guide the air bag in its initial deployment and prevents the air bag housing 14 from bellmouthing, that is, expanding sidewardly, which could result in mis-deployment of the air bag.

Figure 3:
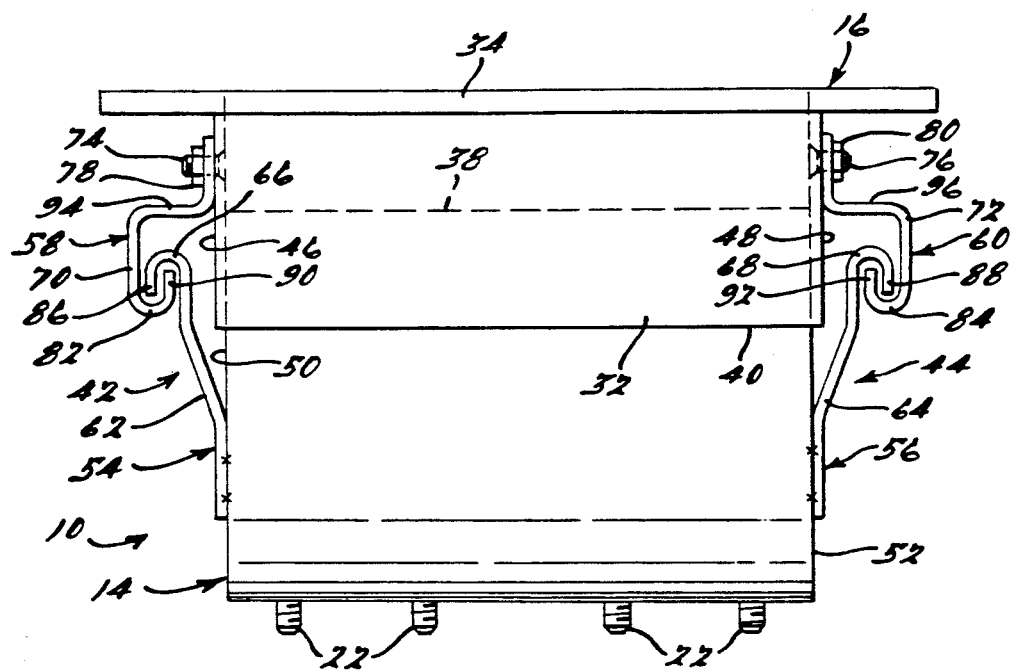
FIG. 3 is a top plan view of the vehicle passenger side air bag structure.
Figure 4:
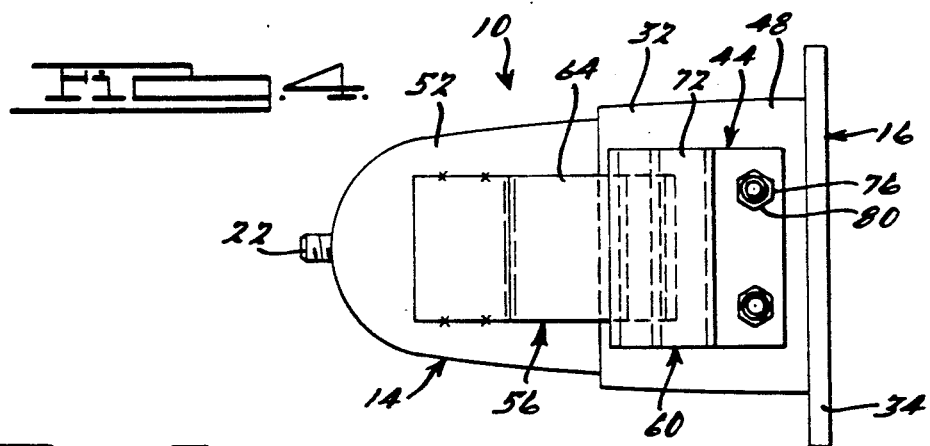
FIG. 4 is an end view of the passenger side air bag structure of FIG. 3 as viewed from the right side thereof.
Figure 5:
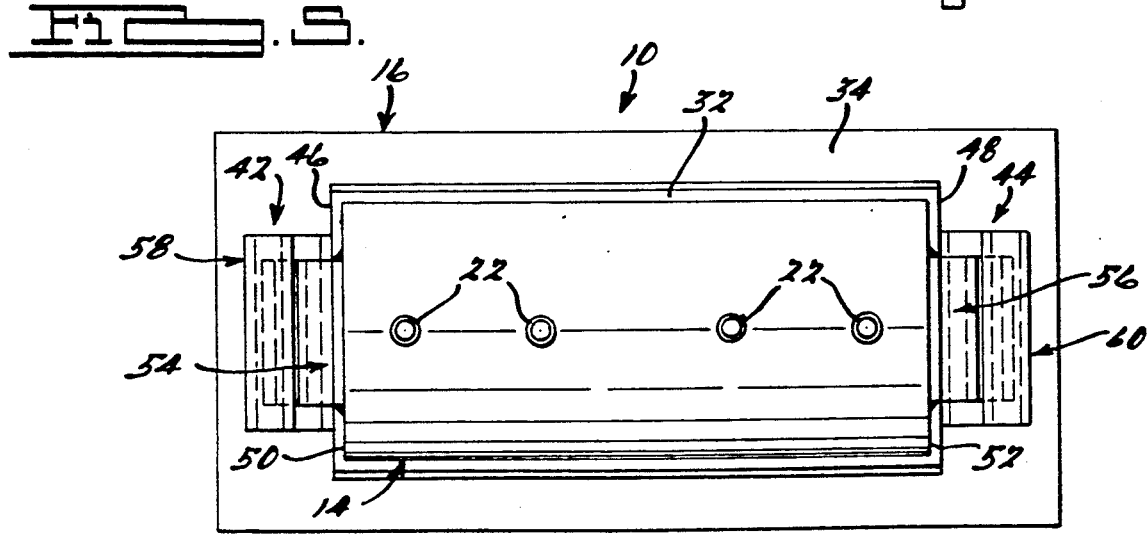
FIG. 5 is a front elevational view of the passenger side air bag structure.

A portion of the air bag housing 14 is slidably received in the air bag deployment chute 16. As will be noted in FIG. 3, the rearward edge 38 of the air bag housing 14 extends to about the midpoint of the air bag deployment chute 16. Inflation of the air bag results in a recoil effect which tends to separate the air bag housing 14 from the air bag deployment chute 16. Should the edge 38 of the air bag housing 14 recede to the edge 40 of the air bag deployment chute 16, it is possible for the air bag to become snagged and mis-deploy. It is therefore desired that such separation of these elements should not occur.

To accomplish this, a connector bracket 42, 44 is provided on each end of the air bag structure, it being noted that the air bag housing 14 and air bag deployment chute 16 have left and right end portions 46, 48 and 50, 52. One of the connector brackets 42, 44 extends between each pair of left and right end portions 46, 48 and 50, 52 of the air bag housing 14 and air bag deployment chute 16.

Each connector bracket 42, 44 comprises a first hook element 54, 56 and a second hook element 58, 60. The hook elements are fabricated of a springy material, such as steel. Each of the first hook elements 54, 56 includes a leg 62, 64 one end of which is secured in place as by welding. The other end of the leg carries a hook 66, 68. The second hook elements 58, 60 also include a leg 70, 72 which is releasably secured in place on the air bag deployment chute by means of outwardly extending threaded studs 74, 76 which pass through openings therein and are held in place by means of internally threaded nuts 78, 80. The other ends of the legs 70, 72 carry hooks 82, 84.

All the hooks are U-shaped, thereby having open mouths. The mouths of the hooks 66, 68 of the first hook elements 54, 56 face away from the instrument panel 12 and the mouths of the hooks 82, 84 of the second hook elements 58, 60 face towards the instrument panel 12. Each hook has a free end portion 86, 88, 90, 92. The free end portion 86, 88 of the hook of each first hook element is received within the hook 82, 84 of a second hook element and the free end portion 90, 92 of the hook of each second hook element is received within the hook 66, 68 of a first hook element. As will be noted in FIG. 3, the free end portions of the hooks are each dimensioned to terminate short of contact with the hooks within which they are received to thereby accommodate variations in the position of the air bag housing 14 with respect to the air bag deployment chute 16.

The hooks 66, 68 of the first hook elements 54, 56 are in line with the hooks 82, 84 of the second hook elements 58, 60 so as to impinge thereagainst upon sliding of the air bag housing 14 into the air bag deployment chute 16. Such impingement causes the legs 62, 64 and 70, 72 to deflect to permit passage of the hooks by each other. After such passage, the legs spring back and carry with them the hooks, which assume the engaging relationship shown in FIG. 3 (it being appreciated that deflection of the legs results in an angular relationship of the hooks which, when returned to normal position, result in the interlocking relationship shown). This interlocking relationship thereafter prevents withdrawal of the air bag housing 14 from the air bag deployment chute 16.

The legs 70, 72 of the second hook elements each include an offsetting segment 94, 96 extending away from the air bag deployment chute 16. The offsetting segments 94, 96 function as stops for the hooks 66, 68 of the first hook elements 54, 56 to limit the extent of sliding of the air bag housing 14 into the air bag deployment chute 16. This feature protects damage to the door 36 by preventing the air bag housing 14 from impinging thereagainst as it might if it were inserted too far into the air bag deployment chute 16.

We claim:

1. Mounting means for a vehicle passenger side air bag structure comprising an air bag structure including an air bag housing for containing an uninflated air bag, an air bag housing bracket secured between the air bag housing and support structure of a vehicle, an air bag deployment chute mounted in an opening provided in a vehicle instrument panel on the passenger side thereof, a portion of the air bag housing slidably received in the air bag deployment chute in a portion of the air bag deployment chute extending forwardly of the instrument panel, the air bag housing and air bag deployment chute each having left and right end portions, a connector bracket extending between each pair of left and right end portions of the air bag housing and air bag deployment chute, each connector bracket comprising a first hook element secured to the air bag housing and a second hook element secured to the air bag deployment chute, each hook element terminating in a substantially U-shaped hook having an open mouth, the mouths of the hooks of the first hook elements facing away from the instrument panel and the mouths of the hooks of the second hook elements facing towards the instrument panel, each hook having a free end portion, the free end portion of the hook of each first hook element being received within the hook of a second hook element and the free end portion of the hook of each second hook element being received within the hook of a first hook element.

2. Mounting means for a vehicle passenger side air bag structure as defined in claim 1, wherein the free end portions of the hooks are each dimensioned to terminate short of contact with the hooks within which they are received to thereby accommodate variations in the position of the air bag housing with respect to the air bag deployment chute.

3. Mounting means for a vehicle passenger side air bag structure as defined in claim 1, wherein each of the first hook elements is fixedly secured in place and each of the second hook elements is releasably secured in place.

4. Mounting means for a vehicle passenger side air bag structure as defined in claim 1, wherein the hook elements are fabricated of a springy material, each hook element comprising a leg one end of which is secured in place and the other end of which carries said hook, the hooks of the first hook elements being in line with the hooks of the second hook elements so as to impinge thereagainst upon sliding of the air bag housing into the air bag deployment chute causing said legs to deflect to permit passage of the hooks by each other and then spring back into engagement with each other and thereafter prevent withdrawal of the air bag housing.

5. Mounting means for a vehicle passenger side air bag structure as defined in claim 1, wherein the legs of the second hook elements each including an offsetting segment extending away from the air bag deployment chute, the offsetting segments functioning as stops for the hooks of the first hook elements to limit the extent of sliding of the air bag housing into the air bag deployment chute.

* * * * *